United States Patent
Weinlich

(10) Patent No.: US 11,308,336 B2
(45) Date of Patent: Apr. 19, 2022

(54) METHOD AND DEVICE FOR OPERATING A CAMERA-MONITOR SYSTEM FOR A MOTOR VEHICLE

(71) Applicant: Continental Automotive GmbH, Hannover (DE)

(72) Inventor: Andreas Weinlich, Villingen-Schwenningen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/902,871

(22) Filed: Jun. 16, 2020

(65) Prior Publication Data

US 2020/0311443 A1 Oct. 1, 2020

Related U.S. Application Data

(63) Continuation of application No. PCT/EP2018/085703, filed on Dec. 18, 2018.

(30) Foreign Application Priority Data

Dec. 20, 2017 (DE) ...................... 10 2017 223 473.3
Feb. 28, 2018 (DE) ...................... 10 2018 202 998.9

(51) Int. Cl.
*G06K 9/00* (2006.01)
*G06T 7/12* (2017.01)
*G06T 7/292* (2017.01)
*G06T 7/536* (2017.01)
(Continued)

(52) U.S. Cl.
CPC ....... *G06K 9/00791* (2013.01); *G06K 9/6232* (2013.01); *G06T 3/4038* (2013.01);
(Continued)

(58) Field of Classification Search
CPC .. G06T 7/12; G06T 7/33; G06T 7/292; G06T 7/536; G06T 3/00; G06T 3/4038; G06K 9/00791; G06K 9/6232
See application file for complete search history.

(56) References Cited

U.S. PATENT DOCUMENTS 10,518,702 B2* 12/2019 Al Rasheed ....... G06K 9/00805
2008/0181488 A1* 7/2008 Ishii ................... G06K 9/00791
382/154

(Continued)

FOREIGN PATENT DOCUMENTS

JP 2002135765 A 5/2002

OTHER PUBLICATIONS https://en.wikipedia.org/wiki/Image_stitching "Image Stitching", 2017.
(Continued)

*Primary Examiner* — John B Strege

(57) ABSTRACT

A method for operating a camera-monitor system for a motor vehicle, in which the camera-monitor system has two cameras which are assigned to a common side of the motor vehicle and are both designed to provide an image of the surroundings of the motor vehicle, wherein the imaged surroundings of the images partially overlap. The system ascertains transformation parameters for transforming a second image of the second camera such that an image element in a peripheral region of a transformed second image connects to a corresponding image element in a peripheral region of a first image of the first camera. Further, ascertaining transformation parameters for transforming the second image in dependence on the ascertained transformation parameters and in dependence on a specification provided for the transformed second image. The system transforms the second image with the further transformation parameters into the transformed second image.

16 Claims, 4 Drawing Sheets

(51) Int. Cl.
*G06K 9/62* (2006.01)
*G06T 3/40* (2006.01)

(52) U.S. Cl.
CPC ............... *G06T 7/12* (2017.01); *G06T 7/292* (2017.01); *G06T 7/536* (2017.01)

(56) References Cited

U.S. PATENT DOCUMENTS

| | | | |
|---|---|---|---|
| 2011/0228101 A1* | 9/2011 | Miksch | H04N 17/002 348/175 |
| 2016/0300113 A1* | 10/2016 | Molin | G06T 7/80 |
| 2016/0358355 A1 | 12/2016 | Lin et al. | |
| 2017/0148138 A1* | 5/2017 | Liu | G06T 7/33 |

OTHER PUBLICATIONS

Jie Hu et al. "Multi-Objective Content Preserving Warping For Image Stitching", 015 IEEE International Conference on Multimedia and Expo (ICME), IEEE, Jun. 29, 2015 (Jun. 29, 2015), Seiten 1-6, XP033188448, D0I: 10.1109/ICME.2015.7177505 [gefunden am Aug. 4, 2015], Section 4: Multi-Objective Content Preserving Warping.

Elan Dubrofsky et al. "Combining Line and Point Correspondences for Homography Estimation", Advances in Visual Computing. ISVC 2008, Springer, Berlin, Heidelberg 032548, XP55296752, ISBN: 978-3-642-17318-9, Bd. 5359, Seiten 202-213, D0I: 10.1007/978-3-540-89646-3_20, Chapter 2: Algorithms for homography estimation.

Junhong Gao et al., "Constructing Image Panoramas using dual-homography warping", Computer Vision and Pattern Recognition (CVPR), 2011 IEEE Conference ON, IEEE, Jun. 20, 2011 (Jun. 20, 2011), Seiten 49-56, XP032037935, DOI: 10.1109/CVPR.2011.5995433, ISBN: 978-1-4577-0394-2, Section 3: Dual-Homography Estimation.

International Search Report and Written Opinion dated Mar. 21, 2019 from corresponding International Patent Application No. PCT/EP2018/085703.

* cited by examiner

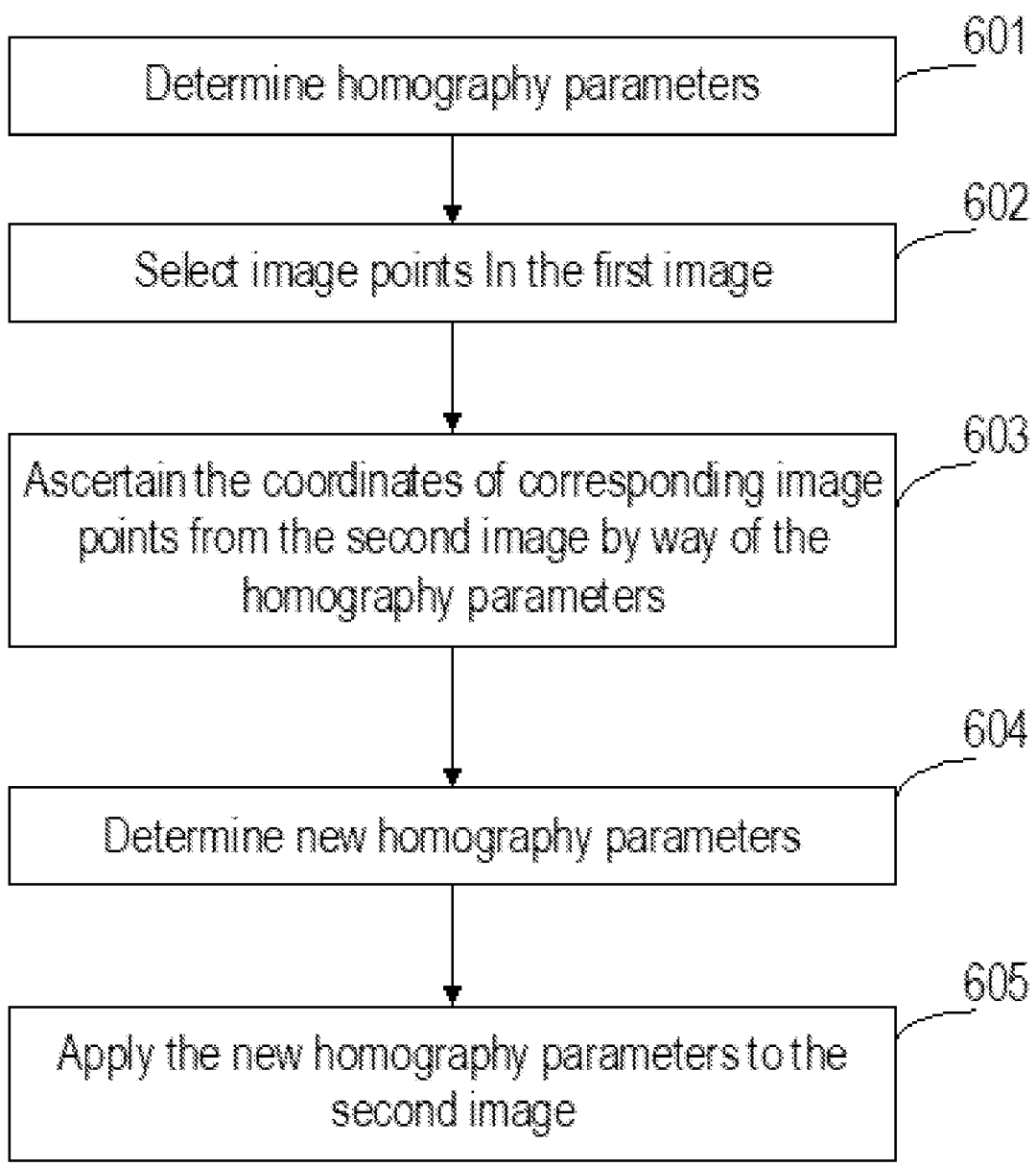

METHOD AND DEVICE FOR OPERATING A CAMERA-MONITOR SYSTEM FOR A MOTOR VEHICLE

CROSS-REFERENCE TO RELATED APPLICATIONS

This U.S. patent application claims the benefit of PCT patent application No. PCT/EP2018/085703, filed Dec. 18, 2018, which claims the benefit of German patent applications No. 10 2017 223 473.3, filed Dec. 20, 2017 and 10 2018 202 998.9 filed Feb. 28, 2018, all of which are hereby incorporated by reference.

TECHNICAL FIELD

The invention relates to an apparatus and method for operating a camera-monitor system for a motor vehicle, in particular for a truck.

BACKGROUND

Motor vehicles, for example trucks and buses, conventionally have exterior mirrors. Mirror replacement systems in which the viewing regions of the typical exterior mirrors are imaged by way of a camera and a monitor are also known.

It is desirable to provide a method for operating a camera-monitor system for a motor vehicle that enables reliable operation. It is furthermore desirable to provide an apparatus for operating a camera-monitor system that enables reliable operation.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In accordance with at least one embodiment, the camera-monitor system has two cameras which are assigned to a common side of the motor vehicle. The cameras are each designed to provide an image of the surroundings of the motor vehicle. The imaged surroundings of the images overlap at least partially, especially in a peripheral region.

Transformation parameters for transforming a second image of the second camera are ascertained. The transformation parameters are ascertained in such a way that an image element in a peripheral region of a transformed second image connects to a corresponding image element in a peripheral region of a first image of the first camera. Further transformation parameters for transforming the second image are ascertained in dependence on the ascertained transformation parameters and in dependence on a specification provided for the transformed second image. The second image is transformed with the further transformation parameters into the transformed second image.

The second image is transformed with the further transformation parameters in order to be able to be attached to the first image by what is referred to as stitching in such a way that the image element is represented in a contiguous manner in the peripheral regions. The first image serves in particular as a reference image. The second image is transformed, for example by way of homography, also known as projective transformation. The transformation parameters are ascertained or specified in such a way that the condition that the image elements in the peripheral regions of the two pictures continuously adjoin each other after the transformation has been met. It is possible by way of the further transformation parameters to meet further conditions for the second transformed image. The transformed second image is thus able to be attached to the first image without any undesired loss of information, and the specification provided is able to be met.

The second image is transformed only once with the further transformation parameters. In particular, the transformation parameters are not used directly for transforming the second image. The ascertained transformation parameters are initially changed depending on the specification provided to the further transformation parameters. Thus, only a single transformation is necessary in order to realize both the desired connection in the peripheral regions and the specification provided.

It is possible to represent the recordings of the two different cameras on the common side in such a way that the represented surroundings are able to be intuitively grasped by a user. Although the first image was taken by a different camera than the second image, the two transformed images connect seamlessly to one another in their peripheral regions. In this case, in particular, the specification provided, which includes, for example, the representation of a legally prescribed field of view, has also been met.

For example, the first camera is a camera with a small viewing angle and a great focal length, for example with a telephoto lens. For example, the second camera is a camera with a small focal length and a large viewing angle, for example with a wide-angle lens. For example, the first camera is used to represent the statutory field of view classes 2 and 4 on a monitor. For example, the second camera is used to represent the statutory field of view classes 5 and, in part, 4. In particular, the method makes it possible to display larger regions of the surroundings than the statutory field of view classes provide. It is thus possible, to represent edges and/or lines visible in the image in the peripheral regions in which the two images adjoin one another in a manner such that they adjoin one another continuously. It is possible to represent almost the entire image region recorded by the cameras in the transformed image. This makes it possible to easily cover the statutory field of view classes. In particular, apart from the homography transformation, no further image transformation needs to be carried out. This saves computing power. Lines lying parallel to the vehicle, such as sides or median strips of the road, are represented in particular without a kink.

According to at least one embodiment, ascertaining the further transformation parameters comprises ascertaining three image points on a straight line in the first image. Three corresponding image points are ascertained on the basis of the second image using the transformation parameters. With the boundary condition that the three image points lie on the straight line, it is easily possible to ascertain the three image points. If two image points have been ascertained, the straight line is defined. The third image point must then lie on that straight line. In particular, the three image points are ascertained such that the straight line lies in the peripheral region of the first image. It is thus possible to realize easy attachment of the first to the transformed second image.

According to at least one embodiment, the further transformation parameters are ascertained such that the three image points in the first image and the three corresponding image points in the transformed second image coincide. The further transformation parameters are ascertained in particular in such a way that the three image points in the first image and the three corresponding image points in the second image coincide after the transformation into the transformed second image. The coordinates of the image points correspond in the first image and in the transformed second image. This enables seamless connection of the two images to each other.

According to at least one embodiment, two further image points are ascertained in the second image. One of the further image points is transformed into a specified point in the transformed second image. The other of the further image points is transformed to a specified straight line depending on the specification provided. For example, the straight line extends through the specified point. A different path for the straight line is also possible. In particular, the further transformation parameters are ascertained in such a way that this transformation is carried out. The other of the further image points is thus not transformable at a freely selectable point, but to the specified straight line. It is thus possible by way of the two further image points to ascertain the further transformation parameters in order to meet the specification provided.

According to at least one embodiment, eight degrees of freedom are used for transforming the second image. Five of the eight degrees of freedom are defined by way of the transformation parameters. The three other degrees of freedom of the eight degrees of freedom are defined by way of the further transformation parameters. Owing to the ascertainment of the three image points on a common straight line and of the two further image points on another further straight line, eight degrees of freedom are sufficient both to be able to meet the specification provided in the second transformed image and to be able to realize a seamless connection between the two images in the peripheral region.

According to at least one embodiment, the specification provided comprises at least one of:
  representing a bottom edge of the motor vehicle so that it is straight,
  representing a line parallel to the bottom edge so that it is straight, and
  representing a specified section from the surroundings. Other specifications are also possible. In particular, the specifications are changeable during operation, for example by a user and/or by a driving situation. For example, the specification is changed depending on whether the motor vehicle is driving slowly and parking or driving fast, for example on a freeway.

According to at least one embodiment, at least one transformation comprises a homography transformation. This makes it possible to connect the contiguous image edges to one another exactly in the peripheral regions of the first image and the second transformed image. Based on the further transformation parameters, it is possible to prevent the transformed second image from being enlarged by way of homography to such an extent that it is no longer possible to display the entire legally required field of view with a specified limited screen size.

The second transformation parameters enable the two images to be connected exactly to one another and thereby the display in particular in the transformed second image of the entire legally required field of view. In addition, it is possible to avoid a strongly distorted image with insufficient image information. The homography transformation carried out only once on the second image enables a reliable and at the same time sufficiently fast transformation. According to at least one exemplary embodiment, the first image is a transformed image of an output image of the first camera. According to further exemplary embodiments, the output image of the first camera is used directly.

According to at least one embodiment, the first image and the transformed second image are represented as an overall image on a common monitor of the camera-monitor system. For example, the first image is represented as the upper image of the overall image. The second transformed image is represented as the lower image of the overall image. The method enables the overall image to be able to be grasped intuitively by a user even though the first transformed image is based on a different camera than the second transformed image. The specification for the transformed second image has also been met.

The apparatus for the motor vehicle which is designed to carry out the method according to at least one embodiment is, for example, part of a control device for the motor vehicle (ECU, electronic control unit).

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 is a flowchart of a method according to an exemplary embodiment.

DETAILED DESCRIPTION

The following description of the preferred embodiment(s) is merely exemplary in nature and is in no way intended to limit the invention, its application, or uses. Identical elements or elements of the same type or with equivalent actions may be denoted by the same reference signs throughout the figures.

Figure 1:
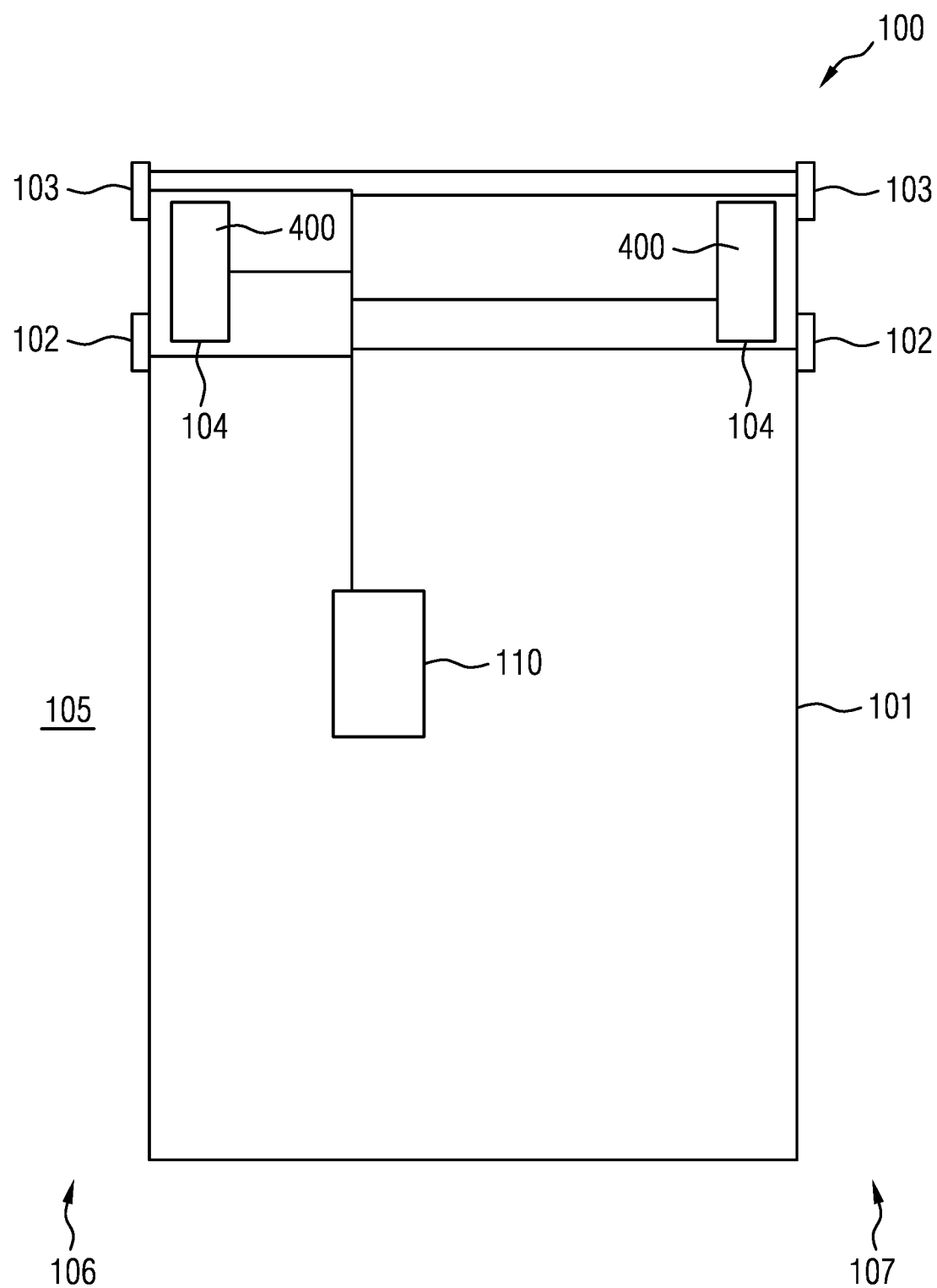
FIG. 1 shows a schematic illustration of a motor vehicle with a camera-monitor system according to an exemplary embodiment.

FIG. 1 shows a schematic illustration of a motor vehicle 101 from above according to an exemplary embodiment. The motor vehicle 101 is, for example, a truck with a trailer, a bus and/or a passenger car.

The motor vehicle 101 has a camera-monitor system 100 as a mirror replacement system. The camera-monitor system 100 has two cameras 102, 103 on each side 106, 107 of the motor vehicle 101. The cameras 102, 103 serve to record the surroundings 105 of the respective assigned side 106, 107.

According to further exemplary embodiments, the two cameras 102, 103 are arranged only on one side of the sides 106, 107.

The camera-monitor system 100 has two monitors 104, which are assigned in each case to one of the sides 106, 107. During operation, a section of the surroundings 105 on the side 106, which section is recorded by the cameras 102, 103 arranged there, is represented on the assigned monitor 104 as an overall image 400. A section of the surroundings 105 is represented as an overall image 400, which is recorded by way of the cameras 102, 103 assigned to the side 107, on the monitor 104, which is assigned to the side 107. The overall image 400 thus differs on the two monitors 104.

The overall image 400 on the monitor 104 is in particular set up to represent a mirror image of a conventional exterior mirror and, in particular, to represent further sections of the surroundings 105 that cannot be imaged with a conventional exterior mirror.

An apparatus 110 with which the cameras 102, 103 and the monitors 104 are coupled for the transmission of signals is provided. The apparatus 110 is set up to control both the cameras 102, 103 and the monitors 104. For example, the apparatus 110 is a control device or part of a control device of the motor vehicle 101.

Figure 2:
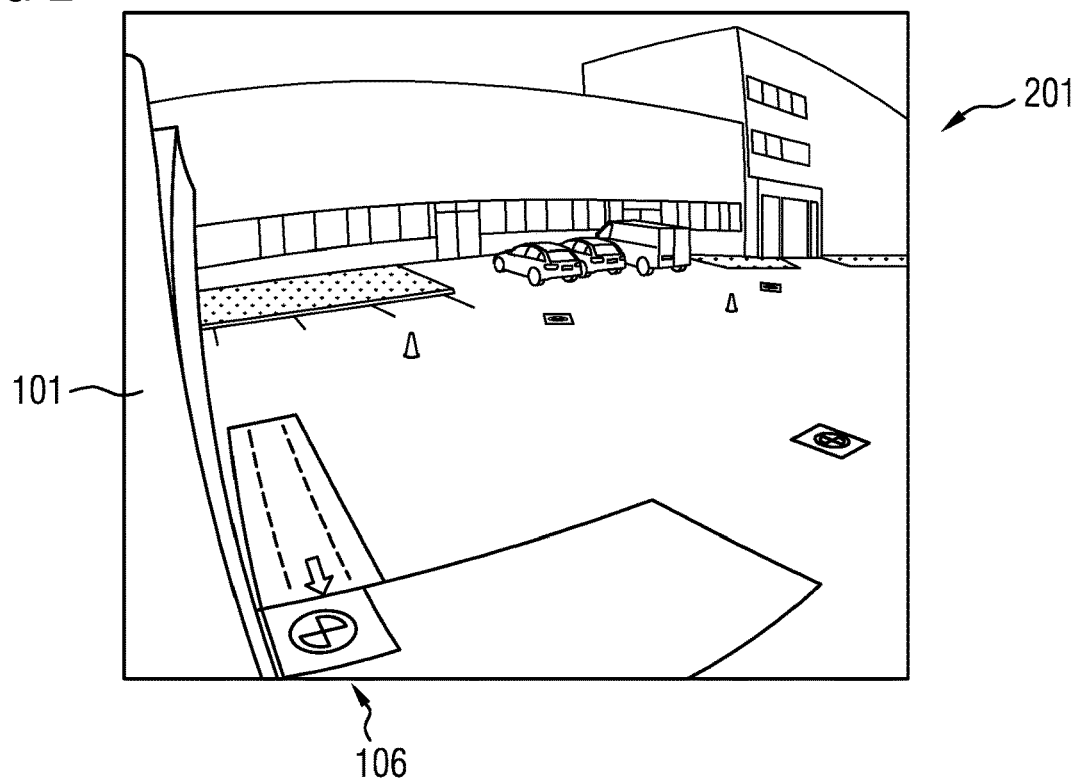
FIG. 2 shows a schematic illustration of an image of a first camera according to an exemplary embodiment.

FIG. 2 shows a first image 201, which is recorded, for example, on the side 106 by way of the first camera 102. The camera 102 records a section of the surroundings 105 to the rear.

Figure 3:
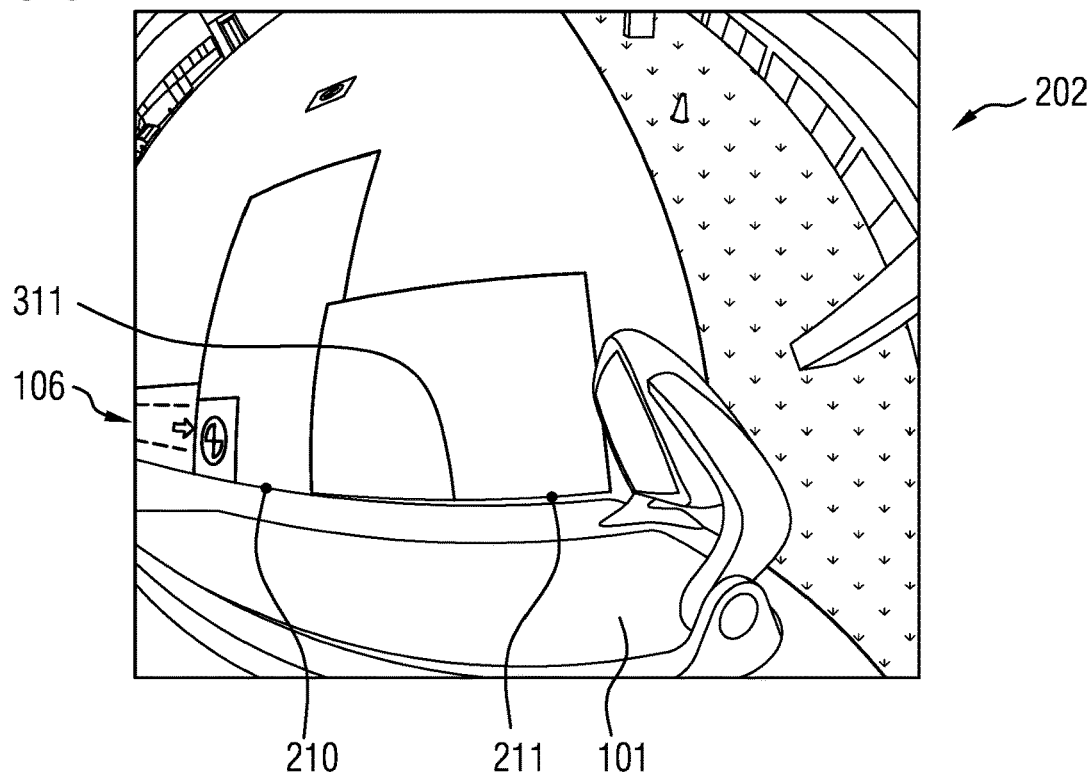
FIG. 3 shows a schematic illustration of an image of a second camera according to an exemplary embodiment.

FIG. 3 shows a second image 202, which is recorded, for example, on the side 106 by way of the second camera 103. The second image 202 shows a section of the surroundings 105 that differs from the first image 201. However, the represented regions of the surroundings 105 overlap at least partially.

The represented images 201, 202 in FIGS. 2 and 3 have not yet been lens-corrected. In particular, a lens distortion correction is carried out first, before the method according to FIG. 6 is then carried out. In particular, the lens-corrected images of the two cameras 102, 103 are connected to one another by way of homography transformation. The images 201, 202 are first lens-corrected, and then the steps of the described method can be applied.

After the method described below in connection with FIG. 6 has been carried out, the overall image 400, which is based on the two images 201, 202, is represented on the monitor 104, as shown in each case by way of example in FIG. 4 and FIG. 5.

Figure 4:
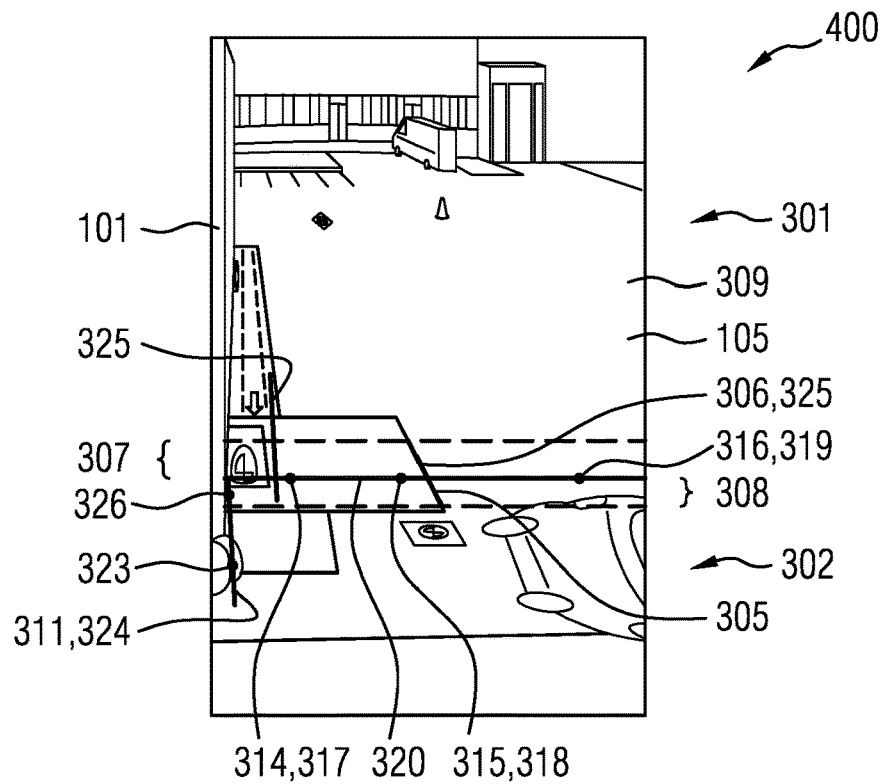
FIG. 4 shows a schematic illustration of an overall image according to an exemplary embodiment.
Figure 5:
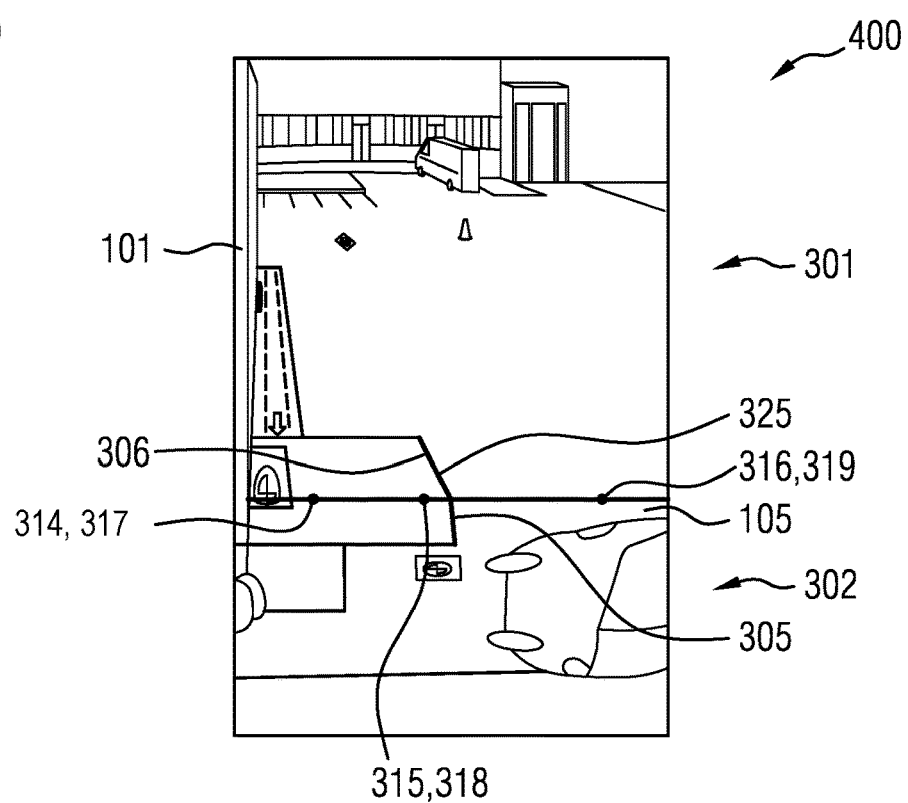
FIG. 5 shows a schematic illustration of an overall image according to an exemplary embodiment.

In the overall image 400 of FIGS. 4 and 5, a transformed first image 301 rather than the first image 201, as is recorded by the first camera 102, is represented in the upper region. The first image 201 is transformed, for example by way of homography, so that specifications for the transformed first image 301 are implemented. For example, the horizon is to be represented horizontally and/or a rear edge of the motor vehicle 101 is to be represented vertically. In this exemplary embodiment, the transformed first image 301 serves as a reference image for the transformation of the second image 202.

The first image 201, 301 is represented for example at the top in the overall image 400. A transformed second image 302 is represented for example at the bottom in the overall image 400. The transformed second image 302 is generated by transforming the second image 202, as will be explained below by way of example.

According to the exemplary embodiment in FIG. 6, the method begins with step 601. In step 601, for example, eight homography parameters are determined in order to be able to seamlessly attach the second image 202 that is to be distorted to the first image 201 that is not to be transformed. The first image 201 serves in particular as a reference image. The first image 201 is not transformed in the method steps according to the exemplary embodiment in FIG. 6. However, it is possible that the image 201 is an image that has already been transformed, for example the first image 201 was created from an image of the first camera 102 by way of lens distortion correction and homography.

In step 602, three image points 314, 315, 316 (FIGS. 4 and 5) are selected to be as far as possible from one another in the first image 201. In particular, the three image points 314, 315, 316 lie in a peripheral region 307 of the first image 201, 301. The peripheral region 307 is the region that adjoins the second image in the overall image 400.

In step 603, the coordinates of corresponding image points 317, 318, 319 are ascertained from the second image 202 by way of the homography parameters from step 601. The corresponding image points 317, 318, 319 correspond to the image points 314, 315, 316. The corresponding image points 317, 318, 319 are located in particular in a peripheral region 308 of the second image 202. The homography parameters are used herefor. In step 603, in particular, no transformation is carried out yet.

The image points 314, 315, 316 lie in the first image 201, 301 and thus in the overall image 400. For example, this is equivalent if the first image is not transformed. Since the second image 302 directly adjoins the first image 301 after the transformation, said points 314, 315, 316 also lie in the transformed second image 302 at the same time. The points 317, 318, 319 which lie in the original, in particular untransformed second image 202 are now determined by way of the homography parameters. In particular, said points 317, 318, 319 cannot be found in the overall image.

In step 604, eight new homography parameters are determined in order to implement at least one further specification for the second transformed image 302. The further homography parameters are based on the homography parameters from step 601, with the result that the corresponding image points of the transformed second image 302 come to lie exactly on the image points 314, 315, 316 of the first image 201. Five degrees of freedom out of the eight available homography parameters are used herefor. The three image points 314, 315, 316 and the corresponding, transformed image points lie on a straight line 320. One X coordinate and one Y coordinate are fixed for each image point 314 to 316. However, one degree of freedom must be subtracted from this, since the third point already lies on the straight line 320 with the other two points. In the case of the homography transformation, straight lines are always mapped to other straight lines. Five degrees of freedom are therefore sufficient.

In order to implement the specification with respect to the image content for the transformed second image 302, three degrees of freedom are thus still available. For example, two further image points 210, 211 (FIG. 3) in the second image 202 are selected manually or automatically. For example, the further image points 210, 211 are selected on a bottom edge 311 of the motor vehicle 101.

The further image point 211 is transformed, for example, on a specified point 323 (FIG. 4). This can be done by manual annotation or automatically using calibration points at defined locations. For example, the two further image points 210, 211 are selected manually in the second image 202 and subsequently the specified point 323 and the corresponding further image point 326 are manually selected in the overall image 400.

Alternatively or additionally, for example, two calibration points are positioned at defined locations in space, which are then transformed to the defined locations in the transformed second image 302.

The specified point 323 and the corresponding further image point 326 lie, for example, on a common straight line 324, for example the bottom edge 311 of the motor vehicle 101. The first of the further image points 211 is freely transformable to the specified point 323. In particular, the second of the further image points 210 cannot be transformed at a freely selectable point. The further image point 210 is transformed to the corresponding further image point 326 on the straight line 324, which cannot be freely determined. Alternatively, it is also possible to map a line in the field of view, for example on a calibration pattern, to a point to be freely determined in the transformed second image 302. Thus three degrees of freedom are sufficient to transform the two further image points 210, 211 or a single further image point 201 and additionally a line by way of homography.

In step 605, the new homography parameters from step 604 are then applied to the second image 202 and thus the transformed second image 302 is generated.

The first image 201 is represented at the top in the overall image 400, for example. The transformed second image 302 is represented at the bottom in the overall image 400, for example. Owing to the method, it is possible to let the two peripheral regions 307 and 308 merge seamlessly into one another while meeting at least one specification for the transformed second image 302.

The specification for the transformed second image 302 includes, for example, that the lateral outer edge, that is to say, for example, the bottom edge 311, of the towing vehicle of the motor vehicle 101 at a bottom plane 309 represents a line that is not kinked, that is to say is imaged so that it is straight. As an alternative or in addition, the specification includes that lines, for example the line 325, are represented on the bottom plane 309 parallel to the bottom edge 311 and are not kinked. As an alternative or in addition, the specification includes that a legally prescribed or a further section of the surroundings 105 at the bottom plane 309 is displayed completely in the overall image 400.

To generate the transformed second image 302, homography parameters are first generated for the lower image 302, as in conventional stitching, in order to seamlessly attach the transformed second image 302 to the upper image 301.

For example, in the upper image 301, the lower left corner point, the lower right corner point and the point in the middle between these two corner points are selected. These correspond to the three image points 314, 315, 316.

By multiplying the homography matrix from the left by these image points 314, 315, 316, the coordinates of the corresponding image points for the still undistorted second image 202 that is to be displayed later in the overall image 400 in the lower region are determined.

The further homography parameters are determined by solving an equation system with eight equations and eight unknowns, so that the three corresponding image points 317, 318, 319 of the still untransformed second image 202 adjoin the three image points 314, 315, 316 of the upper image 301 after the transformation into the transformed second image 302. The further homography parameters are determined, for example, in such a way that the front, left corner point 211 of the towing vehicle of the motor vehicle 101 (as seen from the driver) is transformed to the defined point 323 in the lower image region. Two degrees of freedom are required herefor. The specified point 323 is specified such that it forms the line 324 with the bottom edge 311 of the towing vehicle that can be seen in the upper image region while it is ensured that as much image information as possible of the camera input image 202 is represented downward in the lower image region. In particular, however, no regions lying outside the camera input image 202 that would be represented in black are visible.

In FIG. 4, the specification for the transformed second image 302 is, for example, that the lines 325 that extend parallel to the bottom edge 311 are retained as kinked lines, even if they are represented partly in the upper image 301 and partly in the lower image 302. For this purpose, for example, a point of the second image 202 is mapped to an arbitrary point on the line in the upper image 301 on a line that is visible in both images. One degree of freedom is required herefor.

The further homography parameters ascertained therefrom are applied to the second camera input image 202, and the result is represented in the lower image region of the overall image 400.

FIG. 5 shows a further exemplary embodiment in which the specification for the transformed second image 302 has been changed in comparison to the exemplary embodiment in FIG. 4. Instead of the requirement, as in FIG. 4, that parallel lines should not be represented as kinked, the specification in the exemplary embodiment in FIG. 5 is that as much image information as possible should be visible to the outside on the right. Accordingly, the line 325 is bent in the transition region from the upper image 301 to the lower image 302. For this purpose, a larger section of the surroundings 105 is represented in the lower image region.

Regardless of the specification for the transformed second image 302, an image element 305 of the second transformed image 302 and a corresponding image element 306 of the first image 301 are represented as adjoining one another seamlessly. In the overall image 400, exactly connected image edges and lines between all camera images 301, 302 represented in the monitor 104 are thus realized, and a display of a section corresponding to the specified criteria and specifications and a distortion of the second camera image 202 corresponding to the specified criteria and specifications are possible here.

To automatically ascertain the further homography parameters, it is possible to attach the cameras 102, 103 to provisional calibration holders. The cameras 102, 103 record two calibration points that lie in a plane lying relative to the bottom plane which corresponds to the camera position after the later installation. The one of these calibration points is subsequently mapped to a defined point in the lower region of the image. The other of these calibration points is mapped to an arbitrary point on a defined straight line in the lower region of the image.

In order to generate the transformed second image 302, the second image 202 in particular needs to be transformed only once. This enables a reliable and sufficiently fast transformation.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for operating a camera-monitor system for a motor vehicle comprising: providing a first image of surroundings of the motor vehicle from a first camera; providing a second image of surroundings of the motor vehicle from a second camera, wherein the imaged surroundings partially overlap in the first and second images; ascertaining transformation parameters for transforming a second image of the second camera such that an image element in a peripheral region of a transformed second image connects to a corresponding image element in a peripheral region of a first image of the first camera; ascertaining further transformation parameters for transforming the second image in dependence on the ascertained transformation parameters and in dependence on a specification provided for the transformed second image; and transforming the second image only once with the further transformation parameters into the transformed second image such that the provided specification and connection in edge areas are realized wherein the specification provided comprises at least one of: representing a bottom edge of the motor vehicle so that it is straight, representing a line parallel to the bottom edge so that it is straight, and representing a specified section from the surroundings.

2. The method as claimed in claim 1, wherein ascertaining the further transformation parameters comprises: ascertaining three image points on a straight line in the first image; and ascertaining three corresponding image points based on the second image using the transformation parameters.

3. The method as claimed in claim 2, wherein the straight line lies in the edge region of the first image.

4. The method as claimed in claim 2, in which the further transformation parameters are ascertained such that the three image points in the first image and the three corresponding image points coincide.

5. The method as claimed in claim 1 further comprising: ascertaining two further image points in the second image; transforming one of the further image points into a specified point in the transformed second image; and transforming the other of the further image points to a specified straight line depending on the specification provided.

6. The method as claimed in claim 1, wherein eight degrees of freedom are used for transforming the second image, five degrees of freedom of which are defined by way of the transformation parameters and three other degrees of freedom are defined by way of the further transformation parameters.

7. The method as claimed in claim 1, wherein at least one transformation comprises a homography transformation.

8. The method as claimed in claim 1, further comprising representing the first image and the transformed second image as an overall image on a common monitor of the camera-monitor system.

9. A camera-monitor system for a motor vehicle comprising: a first camera to capture a first image of surroundings of the motor vehicle; a second camera to capture a second image of surroundings of the motor vehicle, wherein the imaged surroundings partially overlap in the first and second images; an electronic control unit connected to the first and second camera with instructions for: ascertaining transformation parameters for transforming a second image of the second camera such that an image element in a peripheral region of a transformed second image connects to a corresponding image element in a peripheral region of a first image of the first camera; ascertaining further transformation parameters for transforming the second image in dependence on the ascertained transformation parameters and in dependence on a specification provided for the transformed second image; and transforming the second image only once with the further transformation parameters into the transformed second image such that the provided specification and connection in edge areas are realized wherein the specification provided comprises at least one of: representing a bottom edge of the motor vehicle so that it is straight, representing a line parallel to the bottom edge so that it is straight, and representing a specified section from the surroundings.

10. The system as claimed in claim 9, wherein ascertaining the further transformation parameters comprises further instructions: ascertaining three image points on a straight line in the first image; and ascertaining three corresponding image points based on the second image using the transformation parameters.

11. The system as claimed in claim 9, wherein the straight line lies in the edge region of the first image.

12. The system as claimed in claim 9, wherein the further transformation parameters are ascertained such that the three image points in the first image and the three corresponding image points coincide.

13. The system as claimed in claim 9, further comprising instructions for: ascertaining two further image points in the second image; Ser. No. 16/902,871 Filed: Jun. 16, 2020 Page: 6 of 8 transforming one of the further image points into a specified point in the transformed second image; and transforming the other of the further image points to a specified straight line depending on the specification provided.

14. The system as claimed in claim 9, wherein eight degrees of freedom are used for transforming the second image, five degrees of freedom of which are defined by way of the transformation parameters and three other degrees of freedom are defined by way of the further transformation parameters.

15. The system as claimed in claim 9, wherein at least one transformation comprises a homography transformation.

16. The system as claimed in claim 9, further comprising instructions for representing the first image and the transformed second image as an overall image on a common monitor of the camera-monitor system.

* * * * *